United States Patent
Kim et al.

(10) Patent No.: US 8,634,421 B2
(45) Date of Patent: Jan. 21, 2014

(54) NETWORK MONITOR AND CONTROL METHOD THEREOF

(75) Inventors: Young-kook Kim, Suwon-si (KR); Cheon-yong Cho, Yongin-si (KR); Hyun-mook Choi, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 268 days.

(21) Appl. No.: 13/032,047

(22) Filed: Feb. 22, 2011

(65) Prior Publication Data

US 2011/0299530 A1 Dec. 8, 2011

(30) Foreign Application Priority Data

Jun. 4, 2010 (KR) ........................ 10-2010-0052854

(51) Int. Cl.
*H04L 12/56* (2011.01)

(52) U.S. Cl.
USPC ............................ 370/392; 345/156; 345/660

(58) Field of Classification Search
USPC ................................... 370/392; 345/156, 660
See application file for complete search history.

(56) References Cited

U.S. PATENT DOCUMENTS

| 7,466,674 | B2 * | 12/2008 | Okagawa et al. ............. 370/328 |
| 2002/0110146 | A1 * | 8/2002 | Thayer et al. ................ 370/465 |
| 2002/0164155 | A1 | 11/2002 | Mate |
| 2004/0194145 | A1 | 9/2004 | Douillet et al. |
| 2004/0196853 | A1 * | 10/2004 | Saito et al. ............... 370/395.21 |
| 2007/0180139 | A1 * | 8/2007 | Oguchi et al. ................ 709/238 |
| 2008/0317031 | A1 * | 12/2008 | Inoue ............................ 370/392 |
| 2010/0009629 | A1 | 1/2010 | Jung et al. |

FOREIGN PATENT DOCUMENTS

| EP | 1 978 712 A2 | 10/2008 |
| EP | 1978712 | * 10/2012 |

OTHER PUBLICATIONS

Extended European Search Report dated Sep. 26, 2011, in counterpart European Application No. 11168584.8.

* cited by examiner

*Primary Examiner* — Dang Ton
*Assistant Examiner* — Mewale Ambaye
(74) *Attorney, Agent, or Firm* — Sughrue Mion, PLLC

(57) ABSTRACT

A network monitor is provided that permits a user to work using only the network monitor without a computer to display an image on the network monitor so that the user's convenience is improved.

16 Claims, 6 Drawing Sheets

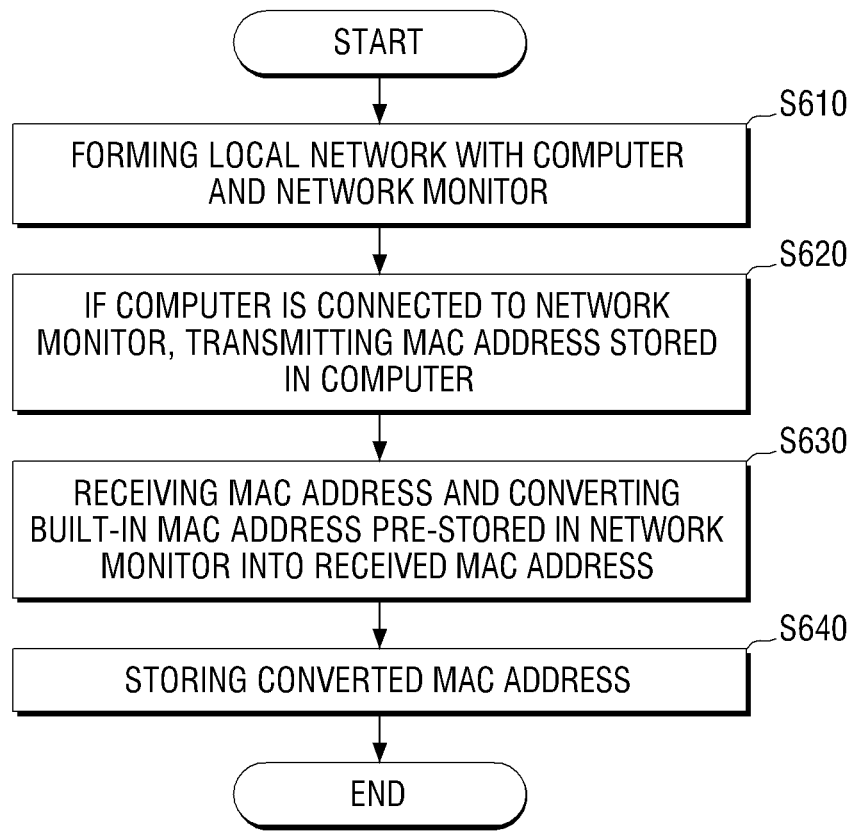

NETWORK MONITOR AND CONTROL METHOD THEREOF

CROSS-REFERENCE TO RELATED APPLICATION

This application claims priority from Korean Patent Application No. 10-2010-0052854, filed on Jun. 4, 2010, in the Korean Intellectual Property Office, the disclosure of which is incorporated herein by reference in its entirety.

BACKGROUND

1. Field

Exemplary embodiments relate to a network monitor and a control method thereof, and more particularly, to a network monitor which can be used independently from a computer and a control method thereof.

2. Description of the Related Art

With the development of electronic technologies, a technology for enabling wireless communication between a monitor, a computer, and a peripheral device, which constitutes a computer system, has been introduced.

Also, a network monitor that can directly receive Ethernet signals over the Internet is being developed.

In a conventional network monitor, however, there is a problem that, in order to alternately use the network monitor and a computer, an Ethernet signal should be connected to each of the network monitor and the computer, or a peripheral device should be installed in each of the network monitor and the computer, or the Ethernet signal and the peripheral device should be switched from the network monitor to the computer or vice versa.

Also, the conventional network monitor is unable to receive network address information from the computer or change the network address information. Also, even if the network monitor and the computer are connected to each other through a local area network (LAN), since the network monitor and the computer have different network address information, the network address information over the Ethernet may collide with each other.

SUMMARY

Exemplary embodiments overcome the above disadvantages and other disadvantages not described above. However, it is understood that an exemplary embodiment is not required to overcome the disadvantages described above, and an exemplary embodiment may not overcome any of the problems described above.

An exemplary embodiment provides a network monitor which switches at least one of an external signal and an access request signal of a peripheral device, which are input into the network monitor, and provides the switched signal to a computer, and a control method thereof.

Also, an exemplary embodiment provides a network monitor which shares network address information with a computer and a control method thereof.

According an exemplary embodiment, a network monitor includes: a communication unit which receives an external signal, an interface connected to at least one of a peripheral device and a computer, and a controller which controls a display to display an image based on the received external signal and, upon receiving a switching request signal, forwards the received external signal to the computer.

The switching request signal may include a video signal that is received from the computer.

The network monitor may further include: a driving unit which scales a video signal received from the computer; and the display unit which displays the image using the scaled video signal.

The communication unit may receive a broadcast signal, and the display unit may display an image using at least one of the broadcast signal and the external signal.

The network monitor may further include a storage unit which stores first network address information, and the controller may read second network address information stored in the computer and convert the first network address information into the second network address information.

The first and second network address information may include a media access control (MAC) address.

The computer and the network monitor may share a same network address information.

In response to changing the second network address information, the controller may read the changed second network address information and update the first network address information with the second network information.

In response to changing the first network address information, the controller may control the interface to transmit the changed first network address information to the computer.

In response to changing the first network address information, the controller may read the second network address information and update the changed first network address information with the second network address information.

According to an exemplary embodiment, a control method of a network monitor includes: receiving an external signal; displaying an image based on the received external signal; receiving a switching request signal; and, forwarding the received external signal to a computer.

The switching request signal may include a video signal that is received from the computer.

The control method may further include: scaling a video signal that is received from the computer, and displaying the image using the scaled video signal.

The control method may further include receiving a broadcast signal, and the displaying may include displaying the image using at least one of the broadcast signal and the external signal.

The control method may further include: storing first network address information, and reading second network address information stored in the computer and converting the first network address information into the second network address information.

The first and second network address information may include a MAC address.

The computer and the network monitor may share a same network address information.

The control method may further include: in response to changing the second network address information, reading the changed second network address information, and updating the first network address information with the second network address information.

The control method may further include: in response to changing the first network address information, transmitting the changed first network address information to the computer.

The control method may further include: in response to changing the first network address information, reading the second network address information; and updating the changed first network address information with the second network address information.

Additional aspects and advantages of the present inventive concept will be set forth in the detailed description, will be obvious from the detailed description, or may be learned by practicing the invention.

BRIEF DESCRIPTION OF THE DRAWINGS

The above and/or other aspects will be more apparent by describing in detail exemplary embodiments, with reference to the accompanying drawings in which:

FIG. 6 is a flowchart illustrating a method of sharing a MAC address of the computer system according to an exemplary embodiment.

DETAILED DESCRIPTION OF THE EXEMPLARY EMBODIMENTS

Figure 1:
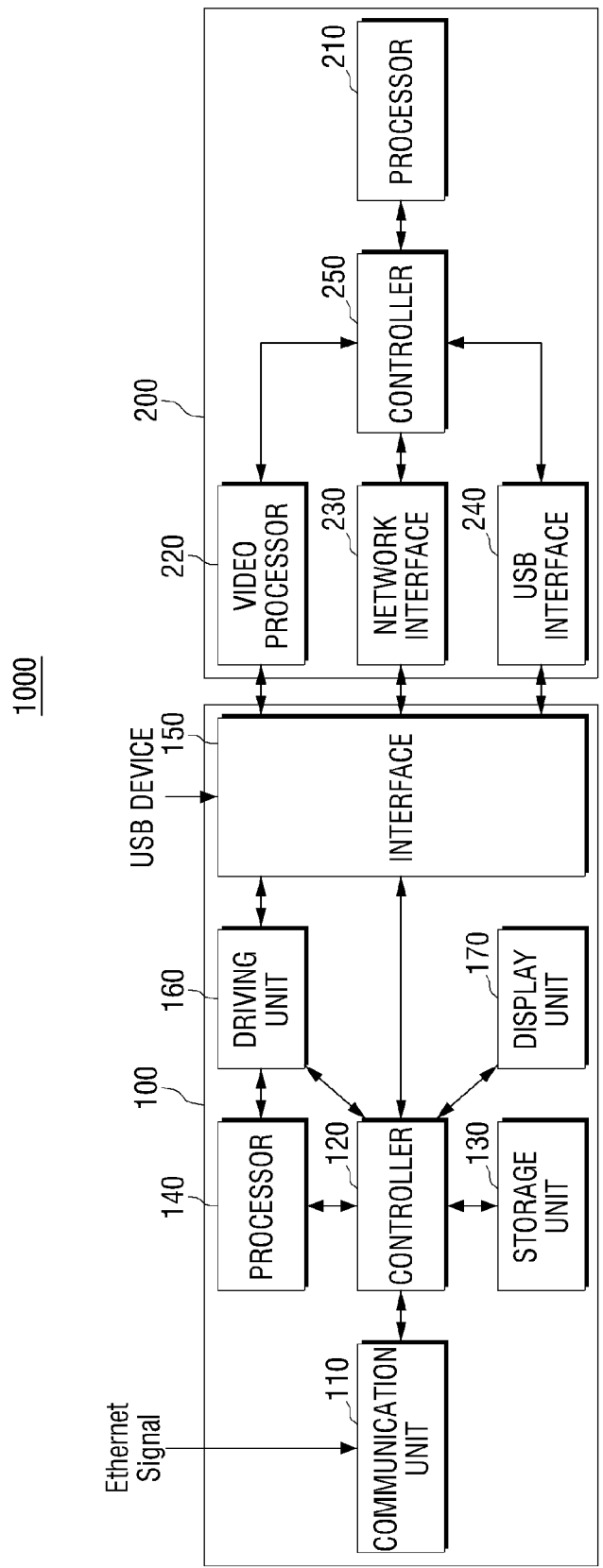
FIG. 1 is a block diagram illustrating a computer system, including a network monitor and a computer, according to an exemplary embodiment.

Hereinafter, exemplary embodiments will be described in greater detail with reference to the accompanying drawings.

In the following description, same reference numerals are used for the same elements when they are depicted in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, functions or elements known in the related art are not described in detail since they would obscure the invention with unnecessary detail.

FIG. 1 is a block diagram illustrating a computer system that includes a network monitor and a computer according to an exemplary embodiment.

Referring to FIG. 1, a computer system 1000 includes a network monitor 100 and a computer 200. The computer 200 may refer to a personal computer, a server, or the like.

The network monitor 100 may be connected to the computer 200 and peripheral devices over wire or the network monitor 100 may be wirelessly connected to the computer 200 and the peripheral devices over radio waves, infrared (IR), and the like.

The network monitor 100 may operate independently even if the computer 200 does not operate. Accordingly, the network monitor 100 may provide an Internet service without the computer 200. Also, the peripheral devices may be connected to the network monitor 100 directly.

More specifically, the network monitor 100 has network address information, that is, a media access control (MAC) address, and accordingly, receives an external signal from an external Internet service provider (ISP) and displays an image using the received external signal. Herein, the external signal may include a signal according to wired and wireless communication standard. For example, the external signal may include an Ethernet signal.

The network monitor 100 according to an exemplary embodiment includes a communication unit 110, a controller 120, a storage unit 130, a processor 140, an interface 150, a driving unit 160, and a display unit 170.

The communication unit 110 receives the external signal over a network, such as the Internet. Also, the communication unit 110 may receive a broadcast signal from a broadcasting station. The communication unit 110 may be realized as a modem or a transceiver, for example.

The controller 120 controls an overall operation of the network monitor 100.

Upon receiving a switching request signal, the controller 120 switches at least one of the received external signal and an access request signal of a peripheral device and provides the switched signal to the computer 200.

The switching request signal may be a video signal that is received from the computer 200.

As an example, the switching request signal may include a video signal, a sync signal, a clock signal, and a command signal by digital downconverter (DDC) communication, which is to be transmitted to the driving unit 160, which will be explained later.

As another example, the switching request signal may be a signal that is received at the network monitor 100 as a button or a key attached on the network monitor 100 or a housing unit (not shown) of the computer 200 is selected.

As still another example, the switching request signal may be a signal that is received at the network monitor 100 from a control program or an application of the network monitor 100 or the computer 200.

As yet another example, the switching request signal may be a signal that is received at the network monitor 100 when the computer 200 is turned on in a state in which only the network monitor 200 is turned on.

The switching operation of the controller 120 may be performed using hardware or software.

The controller 120 reads out network address information stored in the computer 200 and converts network address information pre-stored in the network monitor 100 into the read-out network address information.

The converting operation of the controller 120 may be performed according to the switching request signal. Also, a time at which the converting operation of the controller 120 is performed may be pre-set by a user and stored, and may be changed by the user.

If the network address information of the computer 200 is changed, the controller 120 reads out the changed network address information and updates the network address information stored in the network monitor 100.

Conversely, if the network address information stored in the network monitor 100 is changed, the controller 120 may control the interface 150 to transmit the changed network address information to the computer 200.

Also, if the network address information stored in the network monitor 100 is changed, the controller 120 may read out the network address information stored in the computer 200 and update the changed network address information with the read-out network address information.

The storage unit 130 stores the network address information.

Also, the storage unit 130 may store an application for reading out the network address information, an application for converting the network address information, built-in network address information and network information received from an external apparatus along with converted network address information, and an operating system (OS).

The storage unit 130 may include a read only memory (ROM), a random access memory (RAM), and a registry.

The processor 140 includes a central processing unit (CPU), an OS, a ROM, and a RAM in order to allow the network monitor 100 to operate independently without the computer 200, and performs diverse processes.

The interface 150 is connected to the peripheral devices or the computer 200.

The interface 150 receives an access signal of the peripheral devices such as a mouse, a keyboard, and a universal serial bus (USB) memory. The access signal may be a signal for the peripheral devices to notify the interface 150 of their connections to the interface 150. The peripheral device may be, but not limited to, a USB device.

The interface 150 may include a video adaptor (video card or VGA card, a network adaptor (network interface card), and a USB port (terminal) to receive signals (data or information) from a video processor 220, a network interface 230, and a USB interface 240 of the computer 200, which will be described below in detail.

Although the communication unit 110 and the interface 140 are separate elements in FIG. 1, they may be incorporated into a single element.

The driving unit 160 receives a video signal from the computer 200 and performs scaling with respect to the video signal. The scaling may refer to a process of converting an image transmitted from the computer 200 into a format that is displayable on the network monitor 100 if a characteristic of the image such as a resolution is not suitable for the display on the network monitor 100.

Like in a general computer system including a monitor, a computer, and peripheral devices, the network monitor 100 may receive the video signal of the computer 200 through the interface 150 at the driving unit 160.

The display unit 170 may display an image using the external signal or the broadcast signal received through the communication unit 110.

According to an exemplary embodiment, the computer 200 includes a processor 210, the video processor 220, the network interface 230, the USB interface 240, and a controller 250.

The processor 210 may include a CPU, an OS, a RAM, and a ROM and performs diverse processes in the same way as in the processor 140 of the network monitor 100.

The video processor 220 generates a video signal, a sync signal, a clock signal, and a command signal by DDC communication, and transmits the generated signal to the driving unit 160 through the interface 150. The video processor 220 may be realized as a video adaptor.

The network interface 230 may be connected to the interface 150 of the network monitor 100 through a local area network (LAN). The network interface 230 may be realized as a network interface card.

The USB interface 240 may be connected to the interface 150 of the network monitor 100. The USB interface 240 may be realized as a USB port.

The controller 250 controls an overall operation of the computer 200.

The computer 200 may be located in the vicinity of the network monitor 100 to communicate with the network monitor 100 over wire or wirelessly over radio waves and the like, but may be located far away from the network monitor 100. For example, the computer 200 may be a server that is located at a distant place.

Figure 2:
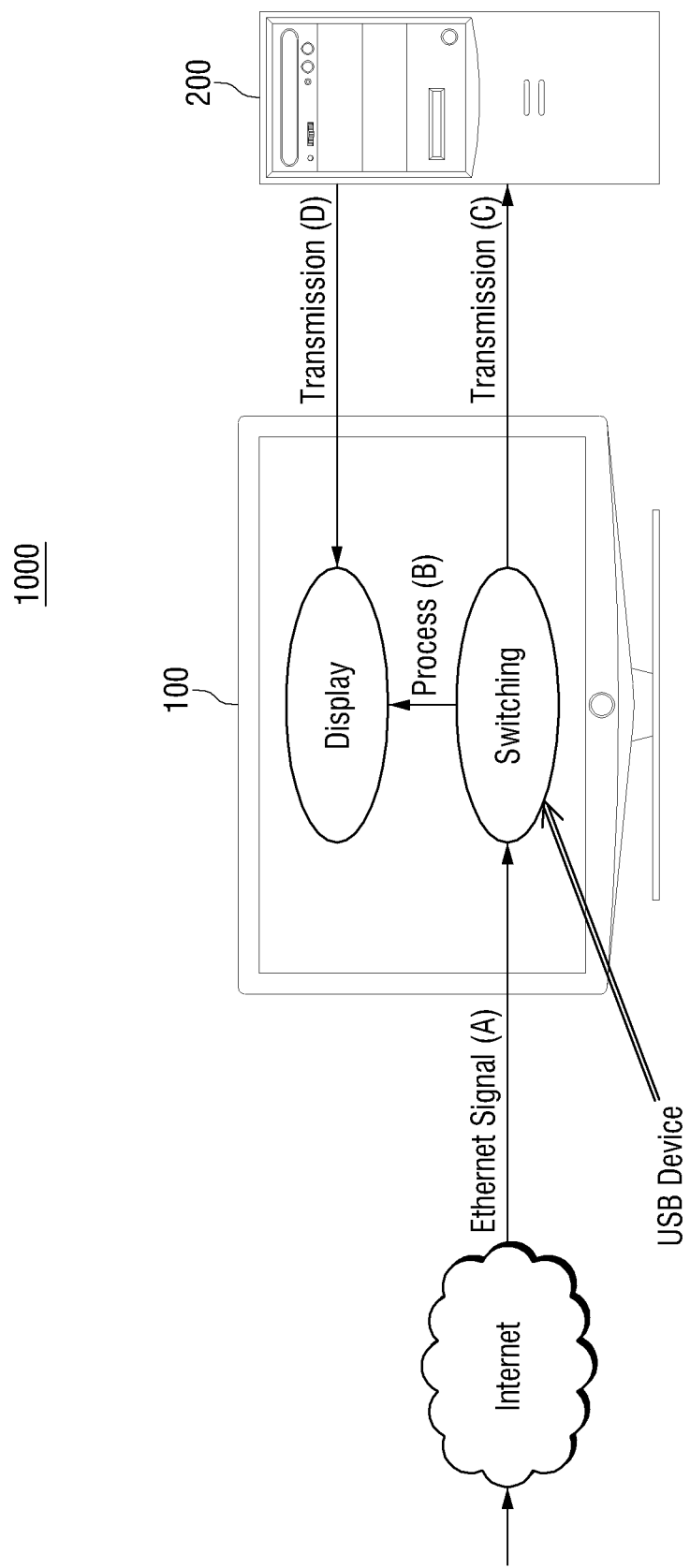
FIG. 2 is a view illustrating a switching operation of the computer system according to an exemplary embodiment.

FIG. 2 is a view to explain a switching operation of the computer system 1000 according to an exemplary embodiment.

Referring to FIG. 2, the network monitor 100 receives the external signal over a network, such as the Internet (A). The controller 120 may control the display unit 170 to display the received external signal on the network monitor 100 (B).

On the other hand, upon receiving the switching request signal from the computer 200, the network monitor 100 may control the display unit 170 to not display the received external signal on the network monitor 100, and bypass the received external signal to the computer 200 (C).

After that, the computer 200 performs diverse processes using the received external signal and transmits the processed signal to the network monitor 100 so that the processed signal can be displayed or replayed at the network monitor 100 (D).

Also, the network monitor 100 may perform a switching operation with respect to the peripheral device in the same way as described above with respect to the external signal.

In this case, the network monitor 100 may display a screen on the display unit 170, for selecting whose signal among a plurality of peripheral devices will be switched.

In addition, according to the switching request signal, the network monitor 100 may switch both the external signal and the access request signal of a peripheral device and provide the external signal and the access request signal to the computer 200.

In the above explanation, the network monitor 100 switches at least one of the external signal and the access request signal of the peripheral device. However, the network monitor 100 may switch a broadcast signal received through the communication unit 100 and provide the broadcast signal to the computer 200 like the external signal.

As described above, since the network monitor 100 performs the switching operation, the network monitor 100 may be a master device and the computer 200 may be a slave device.

Accordingly, if the computer 200 receives the external signal via the network monitor 100 rather than directly over a network, power consumption can be reduced and use of a space can be made better. Only in a special case that requires a high specification, the external signal is set to be received through the computer 200, so that user's convenience can be improved.

Also, the computer 200 may perform the above-described switching operation. More specifically, in the same way as explained with reference to FIG. 2, the computer 200 switches at least one of the external signal, the access request signal of the peripheral device and the broadcast signal under the control of the controller 250 and provides the switched signal to the network monitor 100.

In this case, since the computer 200 performs the switching operation, the computer 200 may be a master device and the network monitor may be a slave device.

Figure 3:
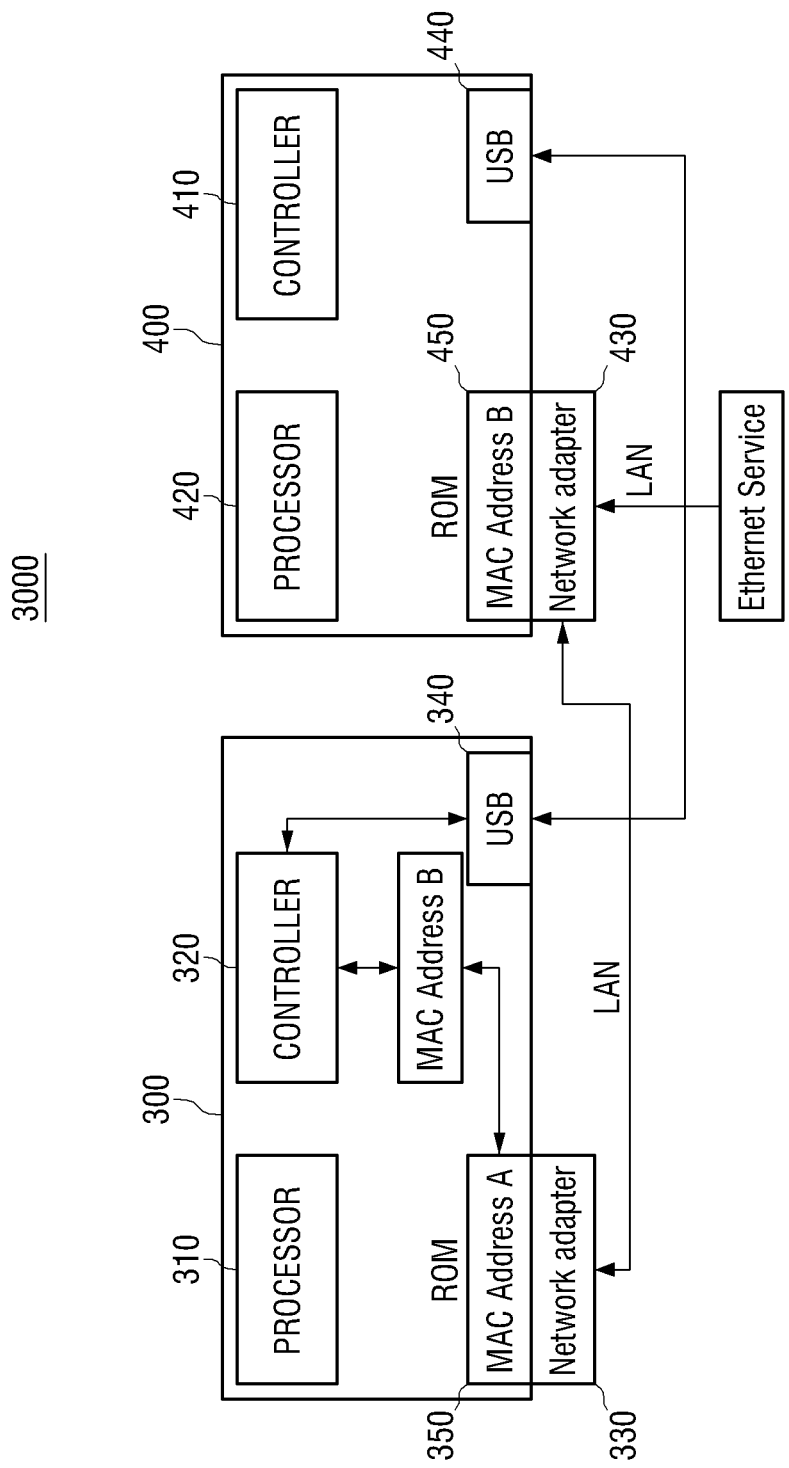
FIG. 3 is a block diagram explaining a method of processing network address information of a computer system according to an exemplary embodiment.

FIG. 3 is a view illustrating a method of processing network address information of a computer system according to an exemplary embodiment.

Referring to FIG. 3, a computer system 3000 includes a network monitor 300 and a computer 400. The respective components of the network monitor 300 and the computer 400 in FIG. 3 perform similar functions as those of the computer system of FIG. 1.

An operation of sharing the same MAC address by the network monitor 300 and the computer 400 will be explained first.

The computer 400 provides an external service through a network adaptor 430. It is assumed that a MAC address B is allocated to the network adaptor 430.

The MAC address is expressed by hexadecimal digits. Each network adaptor (that is, a network interface card) has a 48-bit address having a unique value. For example, if a MAC address is expressed by 00-06-97-8F-4F-86, the 6 hexadecimal digits of the first half (00-06-97) indicate a manufacturer, and the 6 hexadecimal digits of the second half (8F-4F-86) indicate a serial number. The MAC address is called "B" in FIG. 3 for convenience of explanation.

The network monitor 300 already has a unique MAC address "A". This MAC address may be a built-in address.

In this case, if a network adaptor 330 of the network monitor 300 is connected to the network adaptor 430 of the computer 400, the MAC addresses generally collide with each other, so that the network monitor 300 the computer 400 cannot communicate with each other.

In order to solve this problem, the network monitor 300 reads out the MAC address B of the computer 400 when being connected to the computer 400, and converts its own MAC address A into the MAC address B. As one example, the network monitor 300 converts the MAC address simply by copying the MAC address B of the computer 400 to the network monitor 300 and stores the MAC address B.

In this case, since the network monitor 300 has its own MAC address A already stored in the ROM, the network monitor 300 stores data of the MAC address B in a registry.

That is, the network monitor 300 stores its own unique MAC address A in a certain storage area (that is, a ROM), and stores the MAC address B of the computer 400 in another storage area (that is, a registry).

If the network monitor 300 uses the MAC address B, the network monitor 300 and the computer 400 share the same MAC address, that is, the MAC address B.

The reading out of the MAC address and the converting of the MAC address may be performed using a program or an application which is stored in the network monitor 300.

In the above explanation, if the network monitor 300 is connected to the computer 400, the network monitor 300 reads out the MAC address of the computer 400. However, according to another exemplary embodiment, if the network monitor 300 is connected to the computer 400, the computer 400 may transmit the MAC address to the network monitor 300.

Also, the network monitor 300 may not have a pre-stored MAC address. Even in this case, the MAC address B stored in the computer 400 is provided to the network monitor 300 so that the network monitor 300 and the computer 400 can share the same MAC address.

In the case that the network monitor 300 and the computer 400 share the same MAC address, if one of the MAC addresses of the network monitor 300 and the computer 400 is changed, how the MAC address is shared by the network monitor 300 and the computer 400 will be explained.

In an example, if the network address information of the computer 400 is changed, the controller 320 of the network monitor 300 may control to read out the network address information of the computer 400 and update the network address information stored in the network monitor 300. In this case, a storage area (registry) of the network monitor 300 stores the updated network address information.

In another example, if the network address information stored in the network monitor 300 is changed, the controller 320 may control the network adaptor 330 to transmit the changed network address information of the network monitor 300 to the computer 400. Accordingly, the computer 400 changes its own unique network address information to the network address information transmitted from the network monitor 300.

In still another example, if the network address information stored in the network monitor 300 is changed, the controller 320 controls the network monitor 300 to read out the network address information stored in the computer 400 and update the changed network address information with the read-out network address information. In this case, the storage area (registry) of the network monitor 300 stores the updated network address information.

Accordingly, the network monitor 300 and the computer 440 can share the same network address information even if one of the network addresses of the network monitor 300 and the computer 400 is changed or updated.

Figure 4:
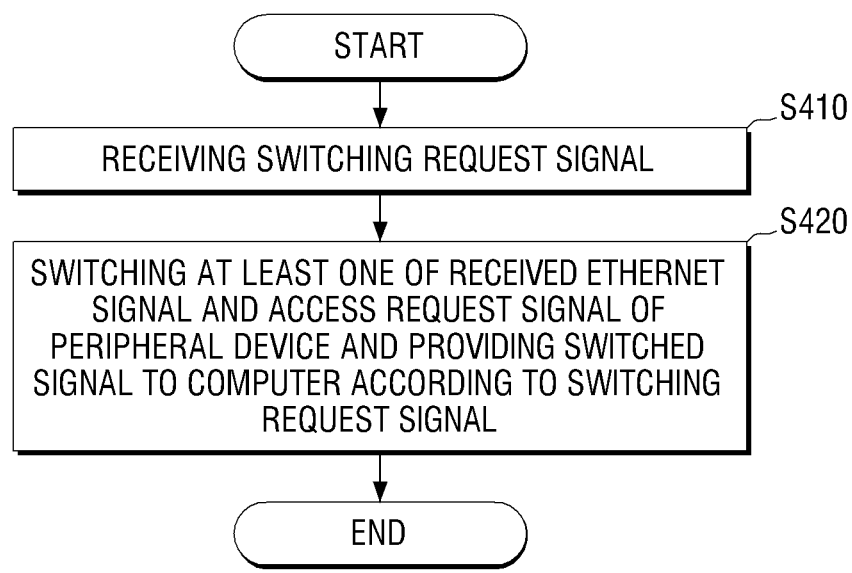
FIG. 4 is a flowchart illustrating a switching operation of the computer system according to an exemplary embodiment.

FIG. 4 is a flowchart illustrating a control method of the network monitor according to an exemplary embodiment. Referring to FIG. 4, the interface 150 of the network monitor 100 receives a switching request signal (S410).

According to the switching request signal, the controller 120 switches at least one of an external signal and an access request signal of a peripheral device and provides the switched signal to the computer 200 (S420).

Accordingly, the network monitor 100 can provide an Internet service without the computer 200, and can switch at least one of the external signal and the access request signal of the peripheral device, if necessary, so that user's convenience can be improved.

The control method of the network monitor 100 may further include scaling a video signal received from the computer 200 and displaying an image using the scaled video signal.

The control method of the network monitor 100 may further include receiving a broadcast signal. The display unit 170 may display an image using one of the broadcast signal and the external signal.

The control method of the network monitor 100 may include storing network address information, and reading out network address information stored in the computer 200 and converting the stored network address information into the read-out network address information.

The control method of the network monitor 100 may further include, if the network address information shared in the computer 200 is changed, reading out the changed network address information, and updating the network address information shared in the network monitor 100.

The control method of the network monitor 100 may further include, if the network address information shared in the network monitor 100 is changed, transmitting the changed network address information to the computer 200.

The control method of the network monitor 100 may further include, if the network address information shared in the network monitor 100 is changed, reading out the network address information stored in the computer 200 and updating the changed network address information with the read-out network address information.

According to a control method of the network computer according to another exemplary embodiment, if the computer 200 accesses the network monitor 100, the network monitor 100 reads out network address information stored in the computer 200.

After that, the network monitor 100 converts pre-stored network address information into the read-out network address information and stores the converted network address information.

After that, if a pre-set event occurs, the network monitor 100 switches an external signal received at the network monitor 100 and provides the switched external signal to the computer 200 using the converted network address information.

An explanation of an overlapped portion will be omitted hereinbelow.

Figure 5:
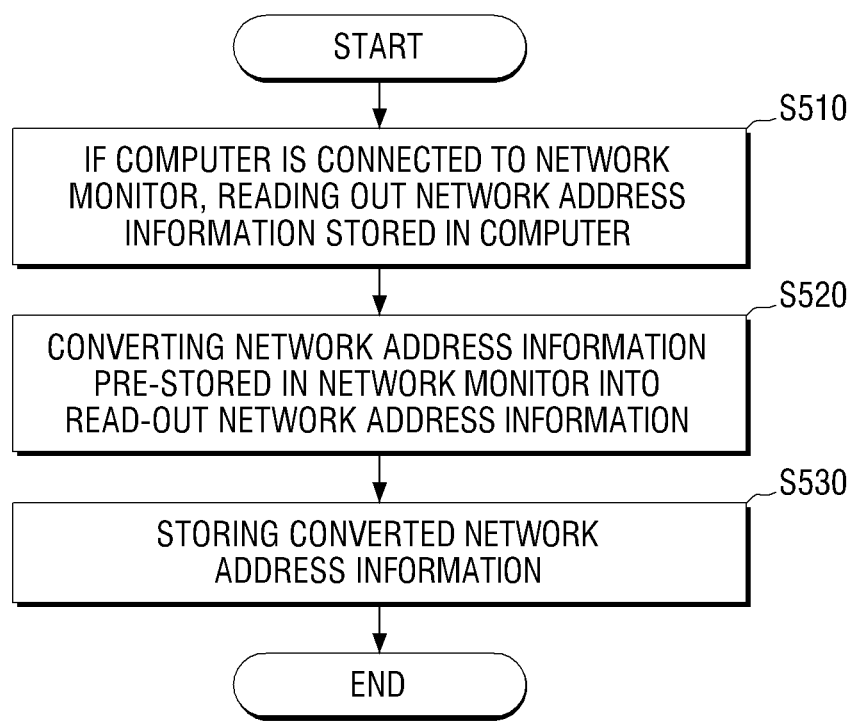
FIG. 5 is a flowchart illustrating a method of sharing network address information of the network monitor according to an exemplary embodiment.

FIG. 5 is a flowchart illustrating a control method of the network monitor according to another exemplary embodiment.

Referring to FIG. 5, if the computer 200 accesses the network monitor 100, the controller 120 reads out network address information stored in the computer 200 (S510).

The controller 120 of the network monitor 100 converts network address information pre-stored in the network monitor 100 into the read-out network address information (S520).

The storage unit 130 stores the converted network address information (S530).

Accordingly, if the network monitor 100 and the computer 200 are connected to each other or if one of the external signal, the broadcast signal, and the access request signal of the peripheral device is switched between the network monitor 100 and the computer 200, the network monitor 100 and the computer 200 can operate without collision of the network address information.

FIG. 6 is a flowchart illustrating a method of sharing a MAC address of the computer system according to an exemplary embodiment.

Referring to FIG. 6, according a method of sharing a MAC address of the computer system 1000, the computer 200 and the network monitor 100 form a local network (S610).

After that, if the computer 200 and the network monitor 100 are connected to each other, a MAC address stored in the computer 200 is transmitted to the network monitor 100 (S620).

Then, the network monitor 100 receives the MAC address and converts a pre-stored built-in MAC address to the received MAC address (S630).

Next, the network monitor 100 stores the converted MAC address (S640).

Also, according to the MAC address sharing method of the computer system 1000, when the computer 200 receives a switching request signal while receiving an external signal, converting the received external signal into a video signal, and providing the converted video signal to the network monitor 100, the computer 200 switches the received external signal and provides the switched external signal to the network monitor 100 using the converted network address information.

Also, according to the MAC address sharing method of the computer system 1000, when the network monitor 100 receives a switching request signal while receiving an external signal, converting the received external signal into a video signal, and displaying the converted video signal, the network monitor 100 switches the received external signal and provides the switched external signal to the computer 200 using the converted network address information.

The foregoing exemplary embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A network monitor comprising:
    a communication unit which receives an external signal;
    an interface connected to at least one of a peripheral device and a computer; and
    a controller which controls a display to display an image based on the received external signal and, upon receiving a switching request signal, forwards the received external signal to the computer,
    wherein, if a first media access control (MAC) address which is an address of the network monitor, is changed, the controller controls the interface to transmit the changed MAC address to the computer when the computer and the network monitor share the same MAC address,
    wherein the switching request signal is automatically originated by the computer when the computer switched from an off state to the power on state, and
    wherein, in response to the received switching request signal, bypassing the displaying of the external signal and forwarding the external signal to the computer; processing by the computer the external signal, transmitting the processed signal from the computer to the monitor, and displaying the processed signal by the monitor.

2. The network monitor as claimed in claim 1, wherein the switching request signal comprises a video signal that is received from the computer.

3. The network monitor as claimed in claim 1, further comprising: a driving unit which scales a video signal received from the computer; and the display unit which displays the image using the scaled video signal.

4. The network monitor as claimed in claim 3, wherein the communication unit receives a broadcast signal, and the display unit displays an image using at least one of the broadcast signal and the external signal.

5. The network monitor as claimed in claim 1, further comprising a storage unit which stores first network address information, wherein the controller reads second network address information stored in the computer and converts the first network address information into the second network address information.

6. The network monitor as claimed in claim 5, wherein, in response to changing the second network address information, the controller reads the changed second network address information and updates the first network address information with the second network address information when the computer and the network monitor share the same network address information.

7. The network monitor as claimed in claim 5, wherein, in response to changing the first network address information, the controller reads the second network address information and updates the changed first network address information with the second network address information when the computer and the network monitor share the same network address information.

8. A control method of a network monitor, the method comprising:
    receiving an external signal;
    displaying an image based on the received external signal;
    receiving a switching request signal;
    forwarding the received external signal to a computer; and
    if a first media access control (MAC) address which is an address of the network monitor is changed, transmitting the changed first MAC address to the computer when the computer and the network monitor share the same MAC address,
    wherein the switching request signal is automatically originated by the computer when the computer switched from an off state to the power on state, and
    wherein, in response to the received switching request signal, bypassing the display of the external signal and forwarding the external signal to the computer; processing by the computer the external signal, transmitting the processed signal from the computer to the monitor, and displaying the processed signal by the monitor.

9. The control method as claimed in claim 8, wherein the switching request signal comprises a video signal that is received from the computer.

10. The control method as claimed in claim 8, further comprising: scaling a video signal that is received from the computer; and displaying the image using the scaled video signal.

11. The control method as claimed in claim 10, further comprising receiving a broadcast signal, wherein the displaying comprises displaying the image using at least one of the broadcast signal and the external signal.

12. The control method as claimed in claim 8, further comprising: storing first network address information; and reading second network address information stored in the computer and converting the first network address information into the second network address information.

13. The control method as claimed in claim 12, further comprising: in response to changing the second network address information, reading the changed second network address information; and updating the first network address information with the second network address information when the computer and the network monitor share the same network address information.

14. The control method as claimed in claim 12, further comprising: in response to changing the first network address information, reading the second network address information; and updating the changed first network address information with the second network address information when the computer and the network monitor share the same network address information.

15. The control method as claimed in claim 8, further comprising displaying on the monitor a screen for selecting whose signal among a plurality of peripheral devices directly connected to the monitor will be switched.

16. The control method as claimed in claim 8, further comprising: in response to the switching request signal, switching both the external signal and access request signal of a peripheral device directly connected to the monitor.

* * * * *